Patented Dec. 5, 1939

2,182,316

UNITED STATES PATENT OFFICE 2,182,316

INTERPOLYMERIZATION OF FUMARIC ESTERS AND ISOBUTYLENE

Heinrich Hopff and Gustav Steinbrunn, Ludwigshafen-on-the-Rhine, Germany, assignors to I. G. Farbenindustrie Aktiengesellschaft, Frankfort-on-the-Main, Germany No Drawing. Application February 9, 1938, Serial No. 189,616. In Germany March 4, 1937

6 Claims. (Cl. 260—86)

The present invention relates to interpolymerization products and to the process of producing the same.

We have found that valuable interpolymerization products are obtained by polymerizing isobutylene with fumaric esters in aqueous emulsion in the presence of polymerization catalysts.

It is surprising that the said substances should be capable of polymerization in emulsion because neither isobutylene nor fumaric esters are capable of polymerization in aqueous emulsion by themselves.

Suitable fumaric esters are in particular fumaric dialkyl esters, as for example fumaric dimethyl, diethyl, di-normal-butyl, di-iso-butyl, dioctyl and di-ethylene-glycol-monomethyl-ether esters. If desired the polymerization may be carried out in the presence of other vinyl compounds or unsaturated compounds which are capable of polymerization under the same conditions, as for example maleic acid esters.

The polymerization is carried out in the usual manner, for example by dispersing the mixture of the components to a fine milk by shaking or stirring in an aqueous solution of a suitable emulsifying agent and, after the addition of a suitable polymerization catalyst, heating until the polymerization is completed; the progress of the polymerization can be followed by the gradual increase in the specific gravity of the emulsion. The degree of polymerization can be regulated by choice of the polymerization temperature, whereby generally speaking the degree of polymerization is lower at higher temperatures and higher at lower temperatures.

Practically all soap-like substances containing a lipophilic and a hydrophilic radicle are suitable as emulsifying agents, as for example salts of alkylnaphthalene sulphonic acid, fatty alcohol sulphonates, Turkey red oils, the hydroxyethylation products of fatty alcohols or C-alkylphenols, the alkali salts of sulphonated mineral oils and the like. In many cases even water-soluble organic liquids, as for example methanol and acetone, are sufficient as emulsifying agents. As polymerization catalysts there may be mentioned in particular compounds giving off oxygen, such as hydrogen peroxide, peracetic acid, persulphates, percarbonates and perborates.

The interpolymerization products are obtained in the form of a white milk which may be directly used without further working up for various purposes, as for example for priming leather, for coatings, as an adhesive and for impregnating textiles. If desired suitable softening agents or fillers may be incorporated with the emulsion during or after the polymerization.

If electrolytes be added to the emulsions, the interpolymerization products are flocculated in a fine form. They may then be separated in the usual manner, for example by suction, centrifuging or the like and subsequent drying. Depending on their composition, they are rubber-like to hard elastic, colorless masses, which are soluble in various organic solvents. The said solutions have a varying high viscosity depending on the degree of polymerization. The solid polymerization products are suitable for example as lacquer raw materials, for the preparation of cable compositions and, in combination with other artificial substances, for a great variety of purposes.

The following example will further illustrate how this invention may be carried out in practice but the invention is not restricted to this example. The parts are by weight.

Example 300 parts of isobutylene and 300 parts of fumaric diethyl ester are emulsified to a fine milk in 1300 parts of a 2 per cent aqueous solution of alpha-hydroxy-octodecane sulphonic acid sodium salt with an addition of 2 parts of potassium persulphate and 10 parts of 30 per cent hydrogen peroxide by shaking in a closed vessel at a pH value of from 4.7 to 5.0 and then heated at 50° C. until the emulsion has attained a specific gravity of 1.3 at 15° C.

From the resulting milky liquid the interpolymerization product formed is precipitated by the addition of hydrochloric acid, filtered off by suction and washed with distilled water. After drying there is obtained a colorless, rather hard mass which dissolves in methylene chloride, benzene and butyl acetate.

By polymerizing under the same conditions 500 parts of isobutylene, 300 parts of fumaric diethyl ester and 10 parts of maleic diallyl ester, a glass-clear, solid interpolymerization product is obtained after flocculation and drying.

What we claim is:

1. A process of producing interpolymerization products which comprises polymerizing a mixture of a fumaric ester and isobutylene in an aqueous emulsion in the presence of substances giving off oxygen as polymerization catalysts.

2. The process of producing interpolymerization products which comprises polymerizing a mixture of a fumaric ester and isobutylene and a vinyl compound capable of polymerization under the same conditions in an aqueous emulsion in the presence of substances giving off oxygen as polymerization catalysts.

3. The process of producing interpolymerization products which comprises polymerizing a mixture of fumaric diethyl ester and isobutylene in an aqueous emulsion in the presence of substances giving off oxygen as polymerization catalysts.

4. An interpolymerization product of a fumaric ester and isobutylene.

5. An interpolymerization product of a fumaric ester, isobutylene and a vinyl compound.

6. An interpolymerization product of fumaric diethyl ester and isobutylene.

HEINRICH HOPFF.
GUSTAV STEINBRUNN.